3,259,547
PROCESS FOR PREPARING INTERFERING VIRUS
George Christopher Cole, Old Bridge, N.J., assignor, by mesne assignments, to E. R. Squibb & Sons, Inc., New York, N.Y., a corporation of Delaware
No Drawing. Filed Sept. 25, 1962, Ser. No. 226,145
4 Claims. (Cl. 167—78)

Interfering virus is a virus that has been modified so that if put in contact with susceptible cells, the interfering virus will enter the cell, will not multiply, but will prevent the multiplication of a virulent virus in that cell. For a fuller discussion of the effect and use of interfering virus, reference is made to an article by Schlesinger in "Viral and Rickettsial Infections of Man," pages 161 to 171 [published by J. B. Lippincott Co. (1952)].

Prior to this invention interfering virus was prepared by either exposing infective virus to ultraviolet irradiation in small volumes (e.g., 5 to 20 ml.) in a Petri plate or other similar shallow container, or, by exposing infective virus, in test tube quantities, to heat. Both of these prior art processes suffered the serious disadvantage of being utilizable with only small volumes of infective virus. There was, therefore, prior to this invention no commercially feasible method for preparing interfering virus in large quantities. Moreover, because of the sensitivity of the virus to either ultraviolet light treatment or heat such large scale production was not considered to be possible.

The present invention, therefore, has for its object a process capable of producing interfering virus in large scale, commercial quantities.

It is another object of this invention to provide a continuous process for preparing interfering virus.

These objects are achieved by the process of this invention which essentially comprises continuously passing an aqueous suspension of infective virus through a helical quartz tubing axially containing a source of ultraviolet light.

The infective virus used in the preparation of the interfering virus of this invention can be obtained from a number of viruses as well known in the art. One source of such virus is influenza virus. Other utilizable viruses include Newcastle disease virus, mumps virus, pneumonia virus of mice, eastern equine encephalomyelctis virus, Saint Louis encephalitis virus, Japanese bencephalitis virus, yellow fever virus, dengue virus, West Nile virus, poliomyelitis virus, Coxsackie virus, Theile GD VII virus, encephalomyocarditis virus, lymphocytic chorimeningitidis virus, vesicular stomatitis virus, fowl pox virus, vaccinia virus, psittacosislymphogranuloma-venereum viruses and popilloma (Shope) virus.

Prior to passage of the virus through the quartz tube, the infective virus is suspended in an aqueous medium. If the infective virus has been inoculated into and incubated in an organic meterial such as embryonated chicken eggs, the allantoic fluid containing the infective virus may be used per se as the medium. In such case, the allantoic fluid is first dialyzed through a semipermeable membrane, such as Visking dialyzing membrane, to remove extraneous, dialyzable, ultraviolet absorbing material. The dialysis can be made against a buffered saline solution, such as Sorensens buffered saline at pH 7.2.

The resulting allantoic fluid containing infective virus can then be centrifuged or filtered, if desired, to remove any solid particles. Centrifugation can be accomplished at about 1,000 r.p.m. to about 5,000 r.p.m. (preferably about 2,000 r.p.m.) for about 5 to about 20 minutes (preferably about 10 minutes).

The supernatant fluid, containing infective virus is then passed through helix of quartz tubing. The tubing is preferably of an inner diameter of about 1 mm. to about 3 mm. (preferably about 2 mm.) and an outer diameter of about 3 mm. to about 5 mm. (preferably about 4.9 mm.). A source of ultraviolet light, that is light having a wavelength of about 2537 A. to about 2,753 A., is positioned axially in the helix. In practice it has been found that an eight watt ultraviolet lamp running lengthwise through the center of the helix is preferable. Such ultraviolet tube emits about 17 microwatts of ultraviolet intensity per square centimeter at a wave length of 2,537 A. at a distance of one meter from the tube.

The passage of the infective virus is so controlled that each square centimeter of infective virus containing medium receives a total exposure of about 9,000 to about 11,000 ergs of ultraviolet irradiation (preferably about 10,000 ergs/cm.$^2$). The amount of irradiation is critical since if substantially less than 5,000 ergs/cm.$^2$ is received virulent virus remains after the treatment and if substantially more than 20,000 ergs/cm.$^2$ is received a portion of the virus is destroyed so that the effectiveness of the interfering virus is diminished. If an eight watt ultraviolet light source is used and the suspension passes one inch from the source, to assure adequate treatment the flow rate of the infective virus suspension is adjusted to about 1.8 to about 1.92 liters per hour (preferably about 1.86 liters per hour).

The interefering virus is then collected by centrifuging the aqueous medium. The centrifugation can be accomplished at a speed of about 17,000 r.p.m. at a flow rate of about 0.24 liter per hour or, preferably, at a speed of about 50,000 r.p.m. at a flow rate of about 1.2 liters per hour. The concentrated virus pellet can then be resuspended in a buffered salt, such as the one described hereinbefore, preferably at a hundred fold more concentrated level than originally used. The new suspension can then be centrifuged at 2,000 r.p.m. and the supernatant containing the interfering virus treated with a preservative such as Merthiolate.

The process of this invention enables the continuous productions of large quantities of interefering virus and thus affords a commercially feasible process for the preparation of this important substance.

The following example illustrates the process of this invention:

*Example*

Influenza virus, type A, strain PR–8, is inoculated into ten days embryonated chicken eggs at a dilution of $1 \times 10^{-4}$. The eggs are incubated at 36° C. for 48 to 72 hours. The eggs are chilled and the allantoic fluid, containing infective virus, in a titer of 2,000 to 4,000 chicken red blood cells agglutination units (HAU) per ml. is harvested from the eggs.

The allantoic fluid suspension is then dialyzed through a Visking dialyzing membrane against a 20 fold volume of M/100 Sorensens buffered saline at pH 7.2 for 48 to 72 hours. The dialyzed allantoic fluid virus suspension is subjected to centrifugation at 2,000 r.p.m. for 15 minutes to remove extraneous solids.

The supernatant fluid, containing infective virus, is pumped via a Sigma T–8 pump or other proportioning pump through a quartz "glass" tubing (I.D. 2 mm.; O.D. 4.9 mm.) coil of 18 revolutions, each helix of the coil being about 1.1 cm. apart. The coil is fixed in position one inch from the surface of an eight watt ultraviolet lamp, type G–8T5, which runs lengthwise through the center of the helix. The ultraviolet tube emits 20 to 40 microwatts of ultraviolet intensity/cm.$^2$ at a wavelength of 2,537 A., at one meter from the source. The flow rate of the infective virus suspension through the quartz coil is 1.86 liters per hour.

The interfering virus is collected in a Sharples centrifuge operating at 50,000 r.p.m. at a flow rate of 1.2 liters/hour. The concentrated virus pellet is resuspended in 1/100 the original virus suspension volume in M/15 Sorensens buffered salt, pH 7.2. The suspension is allowed to settle by gravity overnight at 4° C., is centrifuged at 2,000 r.p.m. for ten minutes and the supernatant containing the interfering virus is saved. Merthiolate is added to the supernatant at a level of 20 mcg./ml.

The process of the example permits the conversion of infective virus into interfering virus at the rate of about 30 liters in 17 hours. Moreover, tests in embryonated eggs reveals that the interfering virus produced is free of infective virus.

This invention may be variously otherwise embodied within the scope of the appended claims.

What is claimed is:

1. A continuous process for preparing a virus that has been modified so that if put in contact with susceptible cells, will enter the cell, will not multiply, but will prevent the multiplication of a virulent virus in the cell which comprises passing an aqueous suspension of infective virus through a helical quartz tubing axially containing a source of ultraviolet light, at such rate that each square centimeter of suspension is subjected to about 9,000 to about 11,000 ergs of ultraviolet irradiation.

2. The process of claim 1 wherein the ultraviolet light has a wave length of about 2,537 A.

3. A continuous process for preparing a virus that has been modified so that if put in contact with susceptible cells, will enter the cell, will not multiply, but will prevent the multiplication of a virulent virus in the cell which comprises passing an aqueous suspension of infective virus selected from the group consisting of influenza virus, Newcastle disease virus, mumps virus, pneumonia virus, eastern equine encephalomyelitis virus, Saint Louis encephalitis virus, Japanese bencephalitis virus, yellow fever virus, dengue virus, West Nile virus, poliomyelitis virus, Coxsackie virus, Theile GD VII virus, encephalomyocarditis virus, lymphocytic chorimeningitidis virus, vesicular stomatitis virus, fowl pox virus, vaccinia virus, psittacosislymphogranulama-venereum viruses and popilloma virus, through a helical quartz tubing axially containing a source of ultraviolet light; said suspension being exposed to a total of from about 9,000 to about 11,000 ergs of ultraviolet irradiation.

4. The process of claim 2 wherein the quartz tubing has an inner diameter of about 1 mm. to about 3 mm. and an outer diameter of about 3 mm. to about 5 mm.

References Cited by the Examiner

UNITED STATES PATENTS

| 1,079,503 | 11/1913 | Linker | 250—48 |
| 2,588,223 | 3/1952 | Erickson et al. | 260—49 |

OTHER REFERENCES

Baluda, M.A. "Loss of Viral Receptors in Homologous Interference by U/V-Irradiated Newcastle Disease Virus," Virology, 1 (3), pp. 315–27, March 1959.

Barry, R. D. "The Multiplication of Influenza Virus: I. Incomplete Virus Formation; II. Multiplicity Reactivation of U/V Irradiated Virus; III. Heterologous Interference," Virology, 14, pp. 389–409, August 1961.

Golde, A., et al., "Isotypical Interference in Vitro by Rous Virus Inactivated by U/V Rays," C.R. Acad. Sci. (Par.), 253: 2782–4, Dec. 4, 1961 (Fr.).

Issacs, A., "Action of Interferon on the Growth of Sublethally Irradiated Virus," Virology, 9, pp. 56–61, September 1959.

McMath W. F., et al., "Investigation of Ultra-violet Radiation in the Control of Chicken Pox Cross-infection," Brit. J. Clin. Pract., 14, Jan. 19–21, 1960.

Oppenheimer, F., et al., "The U/V Irradiation of Biological Fluids in Thin-flowing Films," Am. J. Public Health, 49 (7), pp. 903–23, July 1959.

Schlesinger, "Interference," Virus and Rickettsial Infections of Man, 3rd Ed., Chapter 5, pp. 145–155, published 1959 by J. B. Lippincott Company, Philadelphia, Pa.

Tamm, et al., "The Effect of Monochromatic Ultra-Violet Radiation on the Infectivity and Hemagglutinating Ability of the Influenza Virus Type A Strain Pr-8," J. Bact., 59: 449–461 (1950).

Tischer, I., "The Change of Hemagglutination Ability of Influenza Virus by U/V Radiation," Z. Naturforsch. (B), 14 B: 515–22, August–September 1959 (Ger.).

Kaplan, C., et al., "A Note on the Immunogenicity of U/V Irradiated Vaccinia Virus in Man," J. Hyg. (Lond.), 60, pp. 79–83, March 1962.

Paucker, K., et al., "Quantitative Studies on Viral Interference in Suspended L Cells," Virology, 17, pp. 301–324, June 1962.

Rappaport, I., et al., "Release of Inhibited Virus Infection Following Irradiation With Ultraviolet Light," Virology, 17, pp. 411–9, July 1962.

LEWIS GOTTS, *Primary Examiner.*

S. K. ROSE, *Assistant Examiner.*